(12) United States Patent
Low

(10) Patent No.: US 7,592,926 B2
(45) Date of Patent: Sep. 22, 2009

(54) LIGHT-EMITTING DIODE ASSEMBLY FOR USE IN HEADS-UP DISPLAY SYSTEMS OF PROPELLER-DRIVEN AIRCRAFT

(75) Inventor: Thomas P. Low, Belmont, CA (US)

(73) Assignee: SRI International, Menlo Park, CA (US)

( * ) Notice: Subject to any disclaimer, the term of this patent is extended or adjusted under 35 U.S.C. 154(b) by 614 days.

(21) Appl. No.: 11/459,049

(22) Filed: Jul. 21, 2006

(65) Prior Publication Data

US 2006/0284736 A1 Dec. 21, 2006

Related U.S. Application Data

(63) Continuation-in-part of application No. 10/800,491, filed on Mar. 15, 2004, now Pat. No. 7,081,828.

(51) Int. Cl.
G08B 5/22 (2006.01)
(52) U.S. Cl. ............. 340/815.45; 340/945; 340/971; 340/980; 345/649; 362/269
(58) Field of Classification Search ......... 340/815.45, 340/945, 950, 971, 975, 978, 980; 345/7, 345/30, 31, 619, 649, 652; 415/118; 362/84, 362/85, 269, 272, 800, 549, 555
See application file for complete search history.

(56) References Cited

U.S. PATENT DOCUMENTS

| 4,104,612 | A | 8/1978 | Lowe |
| 4,453,163 | A | 6/1984 | Garner et al. |
| 4,454,496 | A | 6/1984 | Lowe |
| 4,743,903 | A | 5/1988 | Morley |
| 5,844,377 | A | 12/1998 | Anderson et al. |
| 6,064,321 | A | 5/2000 | Fort |
| 6,175,354 | B1* | 1/2001 | Blissett et al. ............ 345/110 |
| 6,348,877 | B1 | 2/2002 | Berstis et al. |
| 6,486,858 | B1 | 11/2002 | Altman |
| 6,496,760 | B1 | 12/2002 | Michaelson et al. |
| 7,161,256 | B2* | 1/2007 | Fang ..................... 290/1 R |
| 7,271,813 | B2* | 9/2007 | Gilbert ................... 345/619 |
| 2003/0174504 | A1 | 9/2003 | Tamaoki |

FOREIGN PATENT DOCUMENTS

| WO | WO 98/13814 A1 | 4/1998 |
| WO | WO 01/93238 | 12/2001 |

* cited by examiner

Primary Examiner—Toan N Pham
(74) Attorney, Agent, or Firm—Guerin & Rodriguez, LLP; Michael A. Rodriguez (57) ABSTRACT

Described is a heads-up display system for an aircraft having a rotating propeller assembly. The heads-up display system includes an electrical interconnection sheet and a plurality of light-emitting diodes (LEDs) electrically connected to the electrical interconnection sheet. The heads-up display also includes means for securing the electrical interconnection sheet onto an outer surface of a propeller blade. A graphics generator disposed in the rotating propeller assembly is in electrical communication with the electrical interconnection sheet to control illumination of the LEDs while the propeller assembly rotates.

20 Claims, 9 Drawing Sheets

LIGHT-EMITTING DIODE ASSEMBLY FOR USE IN HEADS-UP DISPLAY SYSTEMS OF PROPELLER-DRIVEN AIRCRAFT

RELATED APPLICATION

This application is a continuation-in-part application claiming priority to U.S. patent application Ser. No. 10/800,491, filed Mar. 15, 2004, U.S. Pat. No. 7,081,828 titled "Heads Up Display for Propeller-Driven Aircraft," the entirety of which U.S. patent application is incorporated by reference herein.

FIELD OF THE INVENTION

The invention relates generally to aircraft and avionics. More particularly, the invention relates to a heads-up display for a propeller-driven aircraft.

BACKGROUND

Significant investment is flowing into the development of low-cost and simple-to-operate aircraft for personal transportation. Much effort has focused primarily upon developing new cockpit displays that simplify navigation and improve pilot situational awareness. Many of such in-cockpit displays present colorful, graphical representations of the information gathered by onboard instrumentation. The attractiveness of such displays, however, can distract the pilot and divert his attention away from outside the cockpit. Safety concerns attendant with a distracted pilot are evident.

Concerns with pilots looking down at the displays have led to the development of Heads-Up Display (HUD) technology. In general, HUD technology provides a graphical depiction of flight-critical information optically superimposed on a real-world background. With such information appearing on the real-world background, the focus of the pilot's attention remains outside of the cockpit. While looking outside, the pilot can see the information gathered by the aircraft's instrumentation, such as the position of other aircraft, current flight path direction, and navigation waypoints.

U.S. Pat. No. 4,453,163, issued to Garner et al, describes a heads-up-display with a row of lamps embedded on the rear surface of the propeller. This lamp placement requires the removal of material from the propeller to accommodate the lamps and their means of electrical interconnection. In addition, these lamps are vulnerable to damage by foreign objects (gravel and similar debris). Moreover, the structural characteristics of the propeller (e.g., bending stiffness, strength, mass distribution) are affected by adding or removing structural material from the propeller to accommodate the lamps. These disadvantages preclude the use of this heads-up display with existing propellers, because the modification of the propellers would likely compromise their performance and safety.

Many other challenges have impeded wide-scale adoption of HUD technology in light aircraft, including the need for high-brightness displays, practical limitations in HUD system weight, limited field of view, and viewing angle limitations (i.e., narrow optical aperture) that make displays produced by the HUD system viewable only to the pilot. Moreover, current HUD systems are typically expensive and heavy, some systems weighing as much as 60 pounds. Further, the distance of the displayed information from the pilot's eyes is typically significantly shorter than the focal depth of the background, and thus optics are needed to enable the pilot to focus on the information and the background simultaneously. Accordingly, HUD systems have made little progress in being adopted in light aircraft. There remains, therefore, a need for a heads-up display technology that enables graphical information to be overlaid on the real-world background and avoids the aforementioned focal depth, field of view, size, weight, and cost disadvantages of present-day systems.

SUMMARY

In one aspect, the invention features a heads-up display system for an aircraft having a rotating propeller assembly. The heads-up display system includes an electrical interconnection sheet and a plurality of light-emitting diodes (LEDs) electrically connected to the electrical interconnection sheet. The heads-up display system also includes means for securing the electrical interconnection sheet onto an outer surface of a propeller blade. A graphics generator disposed in the rotating propeller assembly is in electrical communication with the electrical interconnection sheet to control illumination of the LEDs while the propeller assembly rotates.

In another aspect, the invention features an aircraft comprising a propeller with a plurality of propeller blades and a heads-up display system. The heads-up display system includes an electrical interconnection sheet and a plurality of light-emitting diodes (LEDs) electrically connected to the electrical interconnection sheet. The aircraft also includes means for securing the electrical interconnection sheet onto an outer surface of one of the propeller blades. A graphics generator disposed in the rotating propeller assembly is in electrical communication with the electrical interconnection sheet to control illumination of the LEDs while the propeller rotates.

In still another aspect, the invention features a propeller assembly comprising a propeller blade, an electrical interconnection sheet, a plurality of light-emitting diodes (LEDs) electrically connected to the electrical interconnection sheet, and means for securing the electrical interconnection sheet onto an outer surface of the propeller blade. The propeller assembly also includes a hub with a graphics generator that is in electrical communication with the electrical interconnection sheet to control illumination of the LEDs while the propeller assembly rotates.

In yet another aspect, the invention features a method of preparing an aircraft propeller for use with a heads-up display system. The method includes providing an electrical interconnection sheet. A plurality of light-emitting diodes (LEDs) is electrically connected to the electrical interconnection sheet to produce an LED assembly. The electrical interconnection sheet is adhered to an outer surface of a propeller blade. The propeller, with the propeller blade having the LED assembly adhered thereto, is balanced.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention features a heads-up display (HUD) system for a propeller-driven aircraft, preferably a single-engine forward-mounted propeller-driven aircraft. In brief overview, the HUD system of the invention includes light-emitting elements disposed on one side of at least one propeller blade. The side of the propeller blade having the light-emitting elements faces the cockpit of the aircraft so that one or more occupants of the cockpit, i.e., the pilot and typically a copilot, can see the light-emitting elements when they become illuminated. The light-emitting elements are bright enough for each occupant to see their illumination in sunlight. The brightness of the light-emitting elements is adjustable, for example, for dimming during periods of reduced ambient light intensity.

To prepare a propeller for use in a HUD system, an LED assembly is adhered to the rear-facing surface of each propeller blade. A manufacturer can apply an LED assembly to each propeller blade prior to balancing the propeller. Each LED assembly includes a narrow, elongated strip or sheet of electrical interconnection material. The length of the electrical interconnection sheet corresponds with the length of the propeller blade, so that the LEDs on the electrical interconnection sheet can extend from near the hub of the propeller to near the tip of the propeller blade. Preferably, the electrical interconnection sheet is a flex circuit. The flexibility of a flex circuit permits the LED assembly to follow closely the contours and twist of the propeller blade, and does not appreciably alter the mechanical or aerodynamic characteristics of the propeller blade.

In general, the electrical interconnection sheet is secured to the outer surface of propeller blade. In one embodiment, in which the LED assembly is applied to a variable pitch propeller, the electrical interconnection sheet has a flexible segment that is attached at one end to the propeller blade and at its other end to the hub. The flexible segment forms a flexible electrical connection between the propeller blade, which is moveable about its own longitudinal axis to adjust blade pitch, and the hub, on which is disposed the graphics processor electronics.

In one embodiment, the LEDs are low profile, surface mount devices. Mounted to a top surface of the electrical interconnection sheet, the LEDs present minimal or no interference with the aerodynamic qualities of the propeller blade. The ability to adhere the electrical interconnection sheet onto the surface of the propeller blade surface avoids having to make cuts, grooves, or other undesirable modifications to the propeller blade for accommodating the LEDs.

The HUD system of the invention makes use of the principle of the persistence of vision. The human eye continues to perceive an image briefly after the image has vanished. Timed activation and deactivation of specific light-emitting elements on the propeller blades, performed in synchronization with the rotation and phase of the propeller, causes at least one high-resolution, stable graphical image to appear in front of the cockpit in the plane of the propeller disk. The image can approach the size of the propeller disk itself, subtending a significant portion of the pilot's forward field of view. The rapid rotation of the propeller renders the propeller blades invisible to an aircraft occupant, so each generated graphical image appears to the occupant to be suspended and superimposed on the real-world background. The occupants can simultaneously observe the displayed graphical images without having to wear special headgear or equipment. As described in more detail below, each occupant may see the same graphical image as or a different graphical image than the other.

Because the light-emitting elements are located on the propeller blades, which, for several types of aircraft, can be approximately 8 to 12 feet distant from the cockpit, the occupant can simultaneously bring into focus the generated graphical image and the real-world background. Further, the distance of the rotating propeller blades from the cockpit and their circumferential span achieve a field of view (FOV) that, for some types of aircraft, such as the Cessna Caravan, approximates 46°.

Although one propeller blade alone can be sufficient to produce a graphical image, multiple propeller blades operate to refresh the displayed graphical image and to provide a failsafe should the lighting mechanism for one propeller blade fail. Capable of replacing or augmenting current cockpit displays, the HUD system of the invention is lightweight and inexpensive, particularly in comparison with current HUD technology. Safety is improved through the improved situational awareness achieved through the use of augmented reality displays. Beneficiaries of the invention include pilots and passengers traveling in the aircraft, and the public at large, from the improved air transportation safety.

Figure 1:
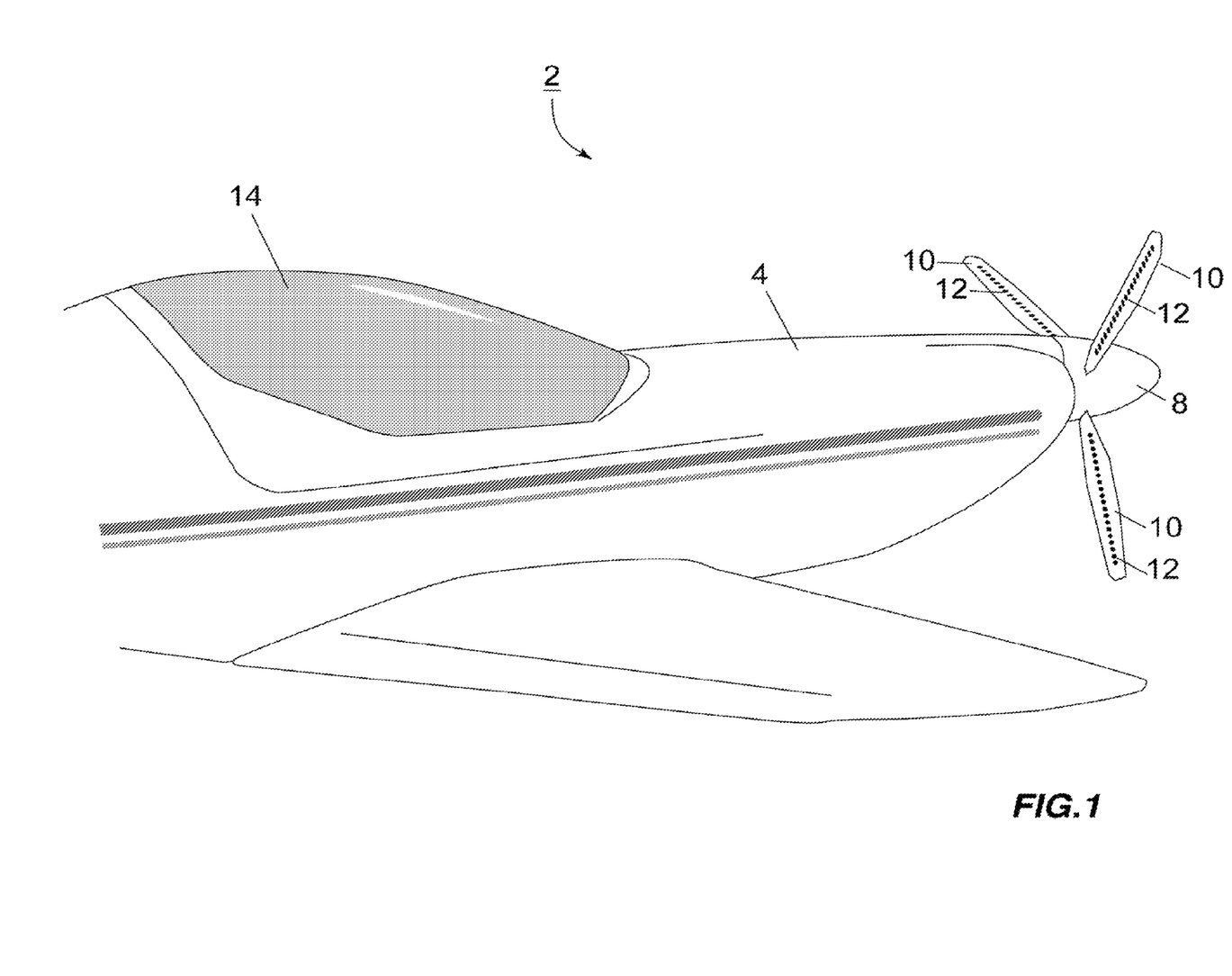
FIG. 1 is a schematic diagram of a front end of an aircraft embodying the heads-up display of the present invention.

FIG. 1 shows a front end of an exemplary aircraft 2 embodying the HUD system of the invention. The aircraft 2 includes an engine 4 for rotating a propeller 6 mounted on the aircraft's nose. The propeller 6 includes a hub (not shown), a conical spinner 8, and a plurality of propeller blades 10 mounted to and radiating from the hub. Examples of propeller-driven general aviation aircraft in which the HUD system can be installed include, but are not limited to, a Cessna 172, a Piper Saratoga, a Cirrus SR-22, and a Lancair Columbia. Although described herein with reference to a propeller with three propeller blades 10, the invention can be practiced with as many propeller blades 10 as there are on the propeller 6 of the aircraft 2.

Disposed on one side of each propeller blade 10 is a set of light-emitting elements 12. The light-emitting elements 12 can be, for example, affixed to an outer surface of the propeller blade 10. Although FIG. 1 shows light-emitting elements 12 on all propeller blades 10, the principles of the invention can be practiced with light-emitting elements 12 on fewer than all blades (e.g., on just one propeller blade). Generally, the light-emitting elements 12 are placed on the propeller blade 10 where they are visible to an occupant of the cockpit 14 (e.g., to the pilot, copilot, or to both). Here, for example, each set of light-emitting elements 12 extends lengthwise along a portion of the propeller blade 10 in a line array. The arrangement of the light-emitting elements 12 may also account for any twist in the shape of the propeller blade 10. Other array arrangements of light-emitting elements 12 can be used without departing from the principles of the invention. The light-emitting elements 12 can be encased in an abrasion-resistant, aerodynamic, transparent housing. Electrical conductors for conducting electrical signals that control illumination of the light-emitting elements extending over an electrical conduction sheet along the propeller blade 10 to various electronics housed in the spinner, described in more detail below.

In one embodiment, the light-emitting elements 12 are light-emitting diodes or LEDs. The particular LEDs used in the HUD system can vary in their radiation patterns (i.e., effective beam angles), colors, and intensities. For example, Luxeon III produces a LED that produces a wide beam of light (a 140° beam angle) at 75,000 mcd (millicandelas). Wide-beam LEDs enable displayed graphical images to be seen simultaneously by each occupant in the cockpit 14. Other LEDs, such as the RY-501NBC844, emit a narrow beam of light (e.g., a 20° beam angle) at a lesser brightness (13,000 mcd). Graphical images produced by illuminating narrow-beam LEDs can be directed so that one occupant of the cockpit within the radiation pattern sees the image while another occupant outside of the radiation pattern does not. These narrow-beam and wide-beam LEDs are sufficiently bright to be visible in daylight and can be dimmed at night to avoid blinding the pilot. Also, LEDs are available in various colors. Accordingly, the HUD system can use any combination of the various colors to display multicolor graphical images. In another embodiment, the light-emitting elements 12 are organic light-emitting diodes (OLEDs). OLEDs are capable of wide viewing angles (up to approximately 160°) in bright light. Hereafter, the terms LEDs and light-emitting elements may be used interchangeably, although it is to be understood that LEDs and OLEDs are specific examples of light-emitting elements.

Figure 2:
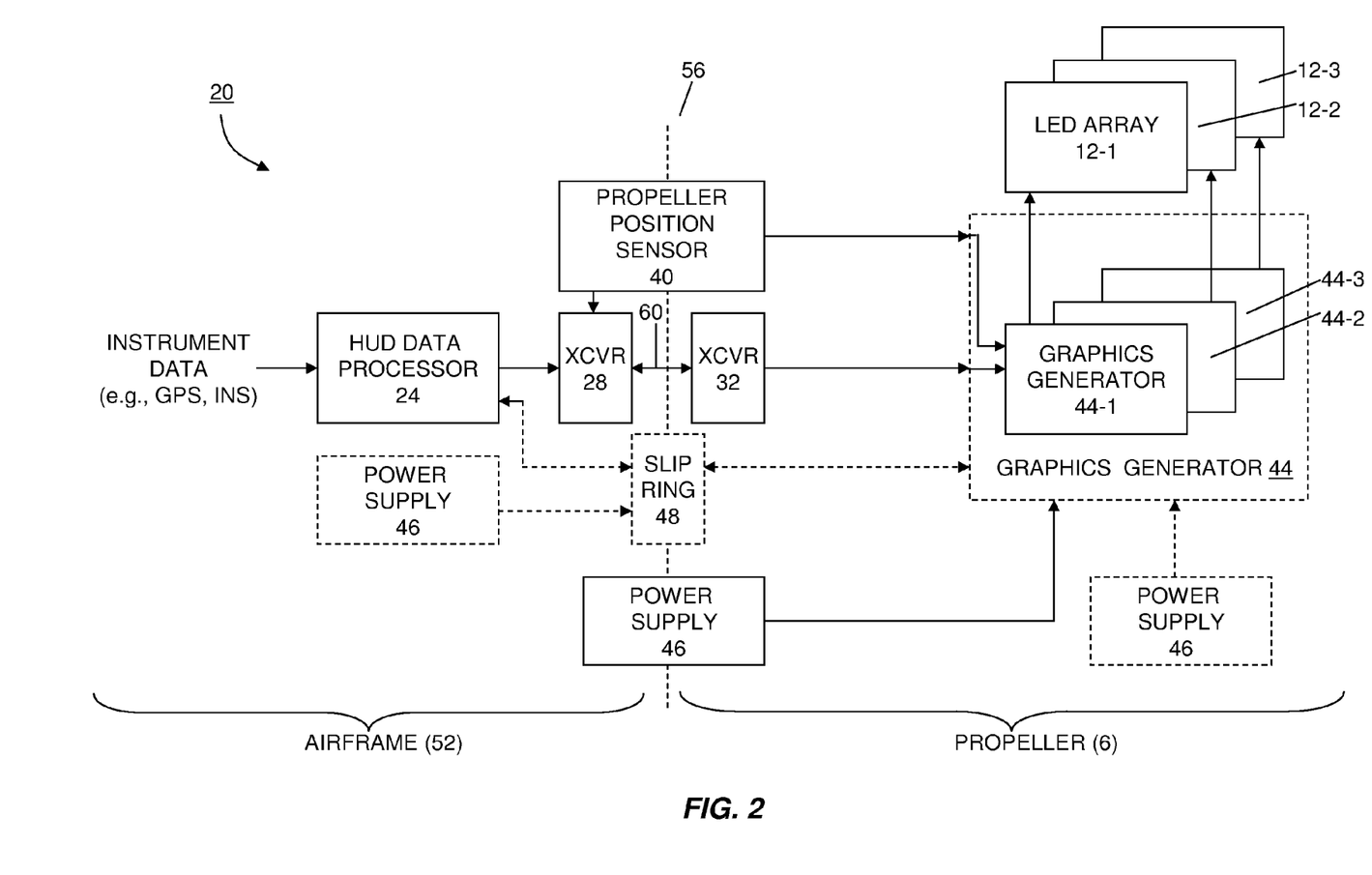
FIG. 2 is a functional block diagram of an embodiment of a heads-up display system of the present invention.

FIG. 2 shows a functional block diagram of an embodiment of a HUD system 20, constructed in accordance with the invention, for use in the propeller-driven aircraft 2. The HUD system 20 includes a HUD data processor 24, a first transceiver 28, a second transceiver 32, a propeller-position sensor 40, a graphics generators 44, and a power supply 46. The graphics generator 44 may include a plurality of graphics generator subunits 44-1, 44-2, and 44-3. Each graphics generator subunit is in communication with a corresponding set of light-emitting elements 12-1, 12-2, and 12-3 on one of the propeller blades 10. Some embodiments, described in more detail below, also include a slip ring 48 (drawn in phantom to indicate another embodiment).

Some portions of the HUD system 20 are embodied in the airframe 52 of the aircraft 2, other portions are embodied in the rotating propeller 6, and still other portions have a stationary component and a rotating component (these are shown straddling the dashed line 56). More specifically, the HUD data processor 24 and first transceiver 28 are part of the airframe 52 (e.g., within the instrument panel of the cockpit 14 of FIG. 1). The second transceiver 32 and graphics generator 44 are part of the rotating propeller 6, housed within the spinner 8. The propeller-position sensor 40, the power supply 46, and, for some embodiments, the slip ring 48 have a stationary airframe component and rotating propeller component. Other embodiments (shown in phantom) have the power supply 46 either fully with the airframe 52 or with the propeller 6.

Communication between the HUD data processor 24 on the airframe 52 and the graphics generator 44 in the rotating propeller 6 can occur in one embodiment wirelessly or in another embodiment by wire. In the wireless embodiment, the first and second transceivers 28, 32 exchange signals, including communications from the HUD data processor 24, over a wireless communication channel 60. Technologies for communicating wirelessly include, but are not limited to, infrared (1R), visible optical, and radio frequency (RF). In general, any part of the electromagnetic spectrum can be used to accomplish the wireless communication. For wired embodiments, shown in phantom, the HUD data processor 24 on the airframe 52 and the graphics generator 44 are in communication through the slip ring 48, which exchanges electrical signals between wires in the stationary airframe 52 and the appropriate wires in the rotating propeller 6.

The HUD data processor 24 is in communication with various aircraft instrumentation to receive electrical signals corresponding to data gathered or measurements made by such instrumentation. For example, the HUD data processor 24 may be in communication with an Inertial Navigation System (INS) having various sensors (e.g., accelerometers and gyroscopes) for tracking and controlling the position and orientation of the aircraft 2. As another example, a Traffic Alert and Collision Avoidance System (TCAS) can provide information regarding range, altitude, and bearing of other aircraft. Yet another example, a Global Positioning System (GPS) can supply geographical location information to the HUD data processor 24. The HUD data processor 24 can be configured to receive signals from other types of navigation systems than those described (e.g., the Attitude Heading and Reference System or AHARS and an air data processor for measuring airspeed and barometric altitude).

The HUD data processor 24 executes program code for determining the information content, appearance, and display location of the graphical image to be produced by the activation and deactivation of the LEDs during the rotation of the propeller 6. The resulting graphical image to be displayed is typically based on the information obtained from the aircraft sensors. The program code produces one or more commands to be interpreted by the graphics generator 44 to generate this graphical image. Each command passes from the HUD data processor 24 to the first transceiver 28 for transmission to the second transceiver 32 over the communication channel 60. Preferably, the communication channel 60 is a low bandwidth channel (e.g., a serial data channel); accordingly, the commands can be defined using a high-level abstraction. For example, a command of "H=090" and "A=5000" can mean that the heading of the aircraft 2 is East at an altitude of 5000 feet. Alternatively, the slip ring 48 conveys the commands to the graphics generator 44.

The propeller-position sensor 40, in general, determines the rotation rate and phase of the propeller 6 so that the graphics generator 44 can modulate the electrical signals controlling LED illumination of the light-emitting elements 12 at the appropriate moments during the rotation of the propeller 6, to cause the display of the graphical image. The graphics generator 44 can control the brightness of each light-emitting element 12 that is illuminated. In one embodiment, the propeller-position sensor 40 measures the rate of rotation and produces an electrical signal or pulse each time the propeller 6 is in a specific position (e.g., a "zero" reference position). The activating and deactivating of the light-emitting elements 12 are then timed from the moment the propeller 6 is in the zero position, in accordance with this rate of rotation, to produce the graphical image at the appropriate positions within each revolution of the propeller 6.

In another embodiment, the propeller-position sensor 40 measures the instantaneous position of the propeller 6, producing thousands of pulses for a single revolution of the propeller 6, with each pulse representing a different angular position in the revolution. (The actual number of pulses determines the granularity with which the instantaneous position can be identified. The finer the granularity, the more precisely known is the instantaneous position of the propeller, and the less reliance there is on knowing the rate of rotation for operating the light-emitting elements.) This embodiment is suited for piston-driven propellers that do not necessarily rotate at a uniform rate within a single revolution because each time a piston fires there is an impulse of force causing instantaneous acceleration and subsequent deceleration until the next piston firing.

The electrical and mechanical components for detecting the zero position of the propeller (or, in another embodiment, the instantaneous position of the propeller), such as a Hall Effect or an optical device, are disposed on the fixed portion of the aircraft (i.e., the airframe 52). Accordingly, the fixed (i.e., non-rotating) side of the propeller-position sensor 40 establishes the timing that provides the basis for activating and deactivating the LEDs 12, and the transceiver 28 sends a timing signal (along with other information) to the graphics generator 44 (through the transceiver 32). The graphics generator 44 can use the timing signal to synchronize its operation with propeller rotation. This arrangement has an advantage of simplifying the placement of the sensor 40.

Alternatively, the electrical and mechanical components for detecting the zero position of the propeller (or, in another embodiment, the instantaneous position of the propeller), such as a Hall Effect or an optical device, are disposed in the rotating propeller and sense their proximity to a airframe-fixed object. This arrangement has an advantage of simplifying the connection of the sensor 40 to the electronics of the graphic generator 44.

Depending upon the particular embodiment, the output generated by the propeller-position sensor 40 can be a series of pulses or an encoded signal representing the instantaneous position of the propeller. As an example of the series of pulses, consider that the propeller-position sensor 40 generates a pulse for every degree of revolution of the propeller 6. In such an instance, 360 pulses occur for each revolution of the propeller 6. The instantaneous position of the propeller 6 can then be determined by a current pulse count (with reference to a zero position). This example is merely illustrative; more or fewer pulses can occur for each rotation.

Example implementations of the propeller-position sensor 40 include, but are not limited to, a photo-interrupter, and a hall-effect sensor, or an inductive proximity sensor (e.g., Pepperl & Fuchs NJ5-11-N inductive proximity sensor).

Each graphics generator subunit 44-1, 44-2, and 44-3 includes a first input terminal for receiving commands issued from the HUD data processor 24 by way of the transceivers 28, 32, and a second input terminal for receiving an encoded signal or electrical pulses issued from the propeller-position sensor 40. From signals arriving on these input terminals, each graphics generator subunit 44-1, 44-2, and 44-3 determines, for its corresponding propeller blade 10, if and when each light-emitting element 12 is activated (on) and deactivated (off) during each revolution of the propeller 6. Activating light-emitting elements can include determining the brightness of the light-emitting elements (LEDs can have different levels of brightness, not just on and off settings). In one embodiment, the graphics generator subunits determine the particular pattern of LED illumination on its corresponding propeller blade independently of the other graphics generator subunits. In another embodiment, a single graphics generator 44 controls the pattern of illumination for all propeller blades 10.

The power supply 46 supplies power to the various electronics on the rotating propeller 6, including the propeller-position sensor 40, graphics generator 44, and light-emitting element arrays 12. In one embodiment, the power supplied by the power supply 46 is generated from the rotational movement of the propeller 6 through the use of stationary magnets and rotating coils. The power is distributed directly from the rotating component of the power supply 46 to the various electronics. Accordingly, a slip ring is not needed to transfer the generated power to the propeller 6, although the slip ring 48 may be used to transfer commands issued from the HUD data processor 24, as described above.

In another embodiment, the power supply 46 resides on the airframe 52. In this embodiment, the slip ring 48 transfers the power to the electronics in the rotating propeller 6. In yet another embodiment, the power supply 46 resides in the rotating propeller 6, for example, as one or more batteries, and supplies power to the electronics directly. Here, the slip ring 48 is not used to transfer power to the electronics in the propeller 6, although the slip ring 48 may be used to transfer commands issued from the HUD data processor 24.

Figure 3A:
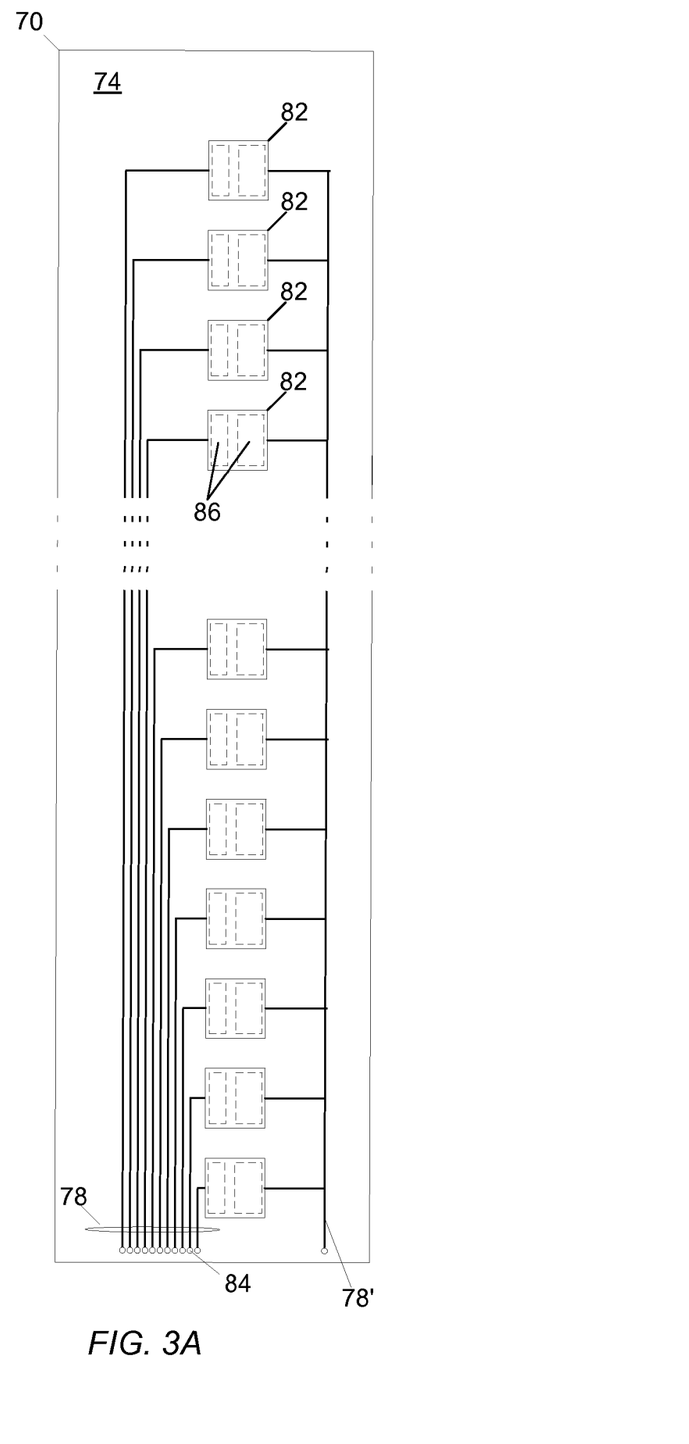
FIG. 3A is a top view diagram of an embodiment of a light-emitting diode assembly, including an electrical interconnection sheet, for use in the heads-up display system.

FIG. 3A shows a top view of an embodiment of an LED assembly 70 that can be used to implement each LED array 12-1, 12-2, 12-3 of FIG. 2. The LED assembly 70 includes an electrical interconnection sheet 74 having a pattern of electrical conductors 78, 78'. In one embodiment, the electrical interconnection sheet 74 is a flexible ("flex") circuit made of a bendable (i.e., pliable) film of insulating material, such as polyester or polyimide, and coated with a dielectric cover layer. The electrical conductors 78, 78' are disposed between the base film and the cover layer. In one embodiment, the electrical interconnection sheet is generally rectangular, approximately one inch in width and 30 to 35 inches in length so that the LEDs can span from near the hub of the propeller 6 to near the tip of the propeller blade 10.

The LED assembly 70 also includes a plurality of LEDs 82, each electrically connected to the electrical conductors 78, 78'. In the embodiment shown, each electrical conductor 78 starts at a through-hole 84 and terminates at an LED 82. Electrical conductor 78' serves as common ground for the LEDs 82. An edge connector (not shown) can be connected (e.g., soldered) to these through-holes 84. The edge connector provides a means by which the LED assembly 70 can be electrically connected to the graphics generator 44 (FIG. 2), in order to receive signals therefrom that enable and disable the LEDs 82.

In one embodiment, each LED 82 is surface mounted to electrical contacts 86 on the top surface of the electrical interconnection sheet 74. In general, the LEDs 82 have the following characteristics: (1) a level of brightness that enables the light of a lit LED to be seen on a bright background, (2) a low profile (e.g., less than 1 mm) so that the LED 82 has minimal impact on the aerodynamics of the rotating propeller 6, and (3) a broad radiation pattern so that the light of the LED can be viewed from a variety of angles with an acceptable level of brightness. Examples of LEDs that satisfy such criteria are the Luxeon Flash LXCL-PWF1 and LXCL-PWF2 devices, manufactured by Lumiled Lighting, LLC of San Jose, Calif. Such devices have a generally rectangular surface-mount footprint that is approximately 2 mm in length and 1.6 mm in width, a low profile of approximately 1 mm (or less) in height, an output of 40 to 80 lumens at 1 ampere, and a broad spatial radiation pattern (e.g., 50% of the intensity of the LED's output is visible at an angular displacement of 120 degrees).

Figure 3B:
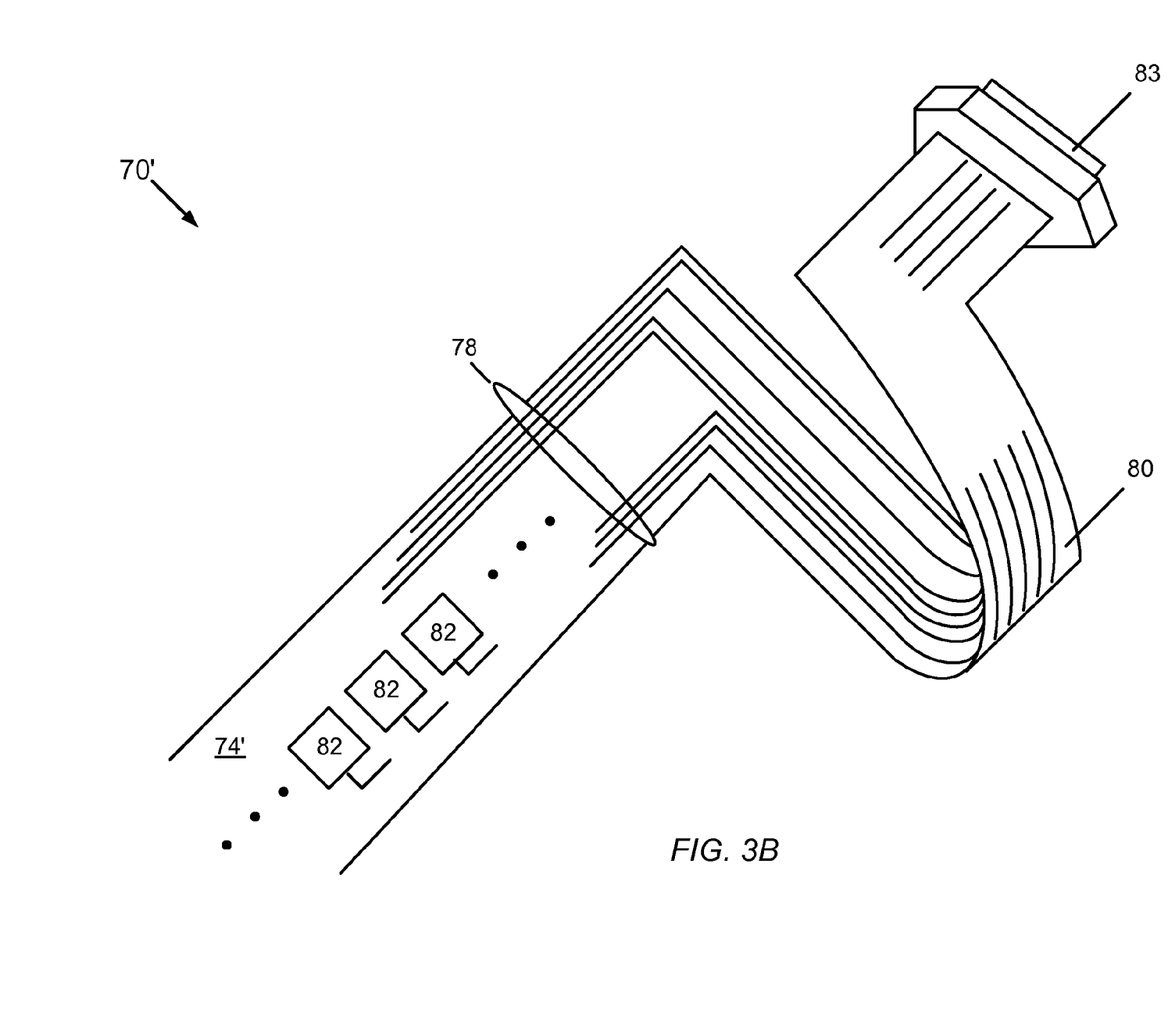
FIG. 3B is a top view diagram of another embodiment of a light-emitting diode assembly in which the electrical interconnection sheet has a flexible segment to maintain electrical connectivity between the LEDs and the graphics generator throughout a range of pitch angles that may be taken by a propeller blade of a variable pitch propeller.

FIG. 3B shows an alternative embodiment of a light-emitting diode assembly 70', including an electrical interconnection sheet 74' with a flexible segment 80. In general, the flexible segment 80 is a flexible circuit loop of the electrical interconnection sheet 74' without any LEDs 82. The length and width of the flexible segment 80 relative to the remainder of the electrical interconnection sheet 74' may vary from that shown.

This embodiment of light-emitting diode assembly 70' may be used with a variable pitch propeller. Blades of a variable pitch propeller are movable along their longitudinal axis to adjust the pitch of the propeller blade. The blade can move through a range of pitch angles (e.g., 30 to 90 degrees). One end of the flexible segment 80 attaches to the propeller blade and the other end 83 attaches to the hub (on which is disposed the graphics generator 44). The flexible segment 80 maintains an electrical connection between the LEDs 82 (on the propeller blade) and the graphics generator 44 (on the hub) throughout the range of pitch angles that the propeller blade may take during operation.

Figure 4A:
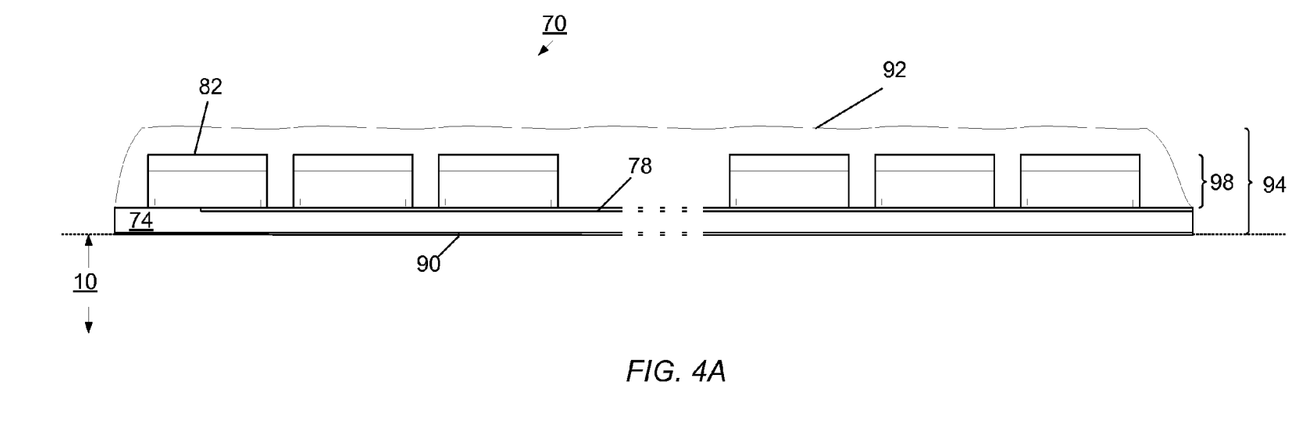
FIG. 4A is a side view of the light-emitting diode assembly of FIG. 3A.

FIG. 4A shows a side view of the LED assembly 70 of FIG. 3A. The side view shows an adhesive layer 90 on the bottom surface of the electrical interconnection sheet 74 for attaching the LED assembly 70 to the outer surface of the propeller blade 10. In one embodiment, the adhesive layer 90 is comprised of a 7 mil thick 3M™ Adhesive Transfer Tape 468. Other means can be used to secure the LED assembly 70 to the surface of the propeller blade 10, including, but not limited to, glues, epoxies, tape. Glues and epoxies can be applied between the bottom surface of the electrical interconnection sheet 74 and surface of the propeller blade 10, whereas tape can be applied to the top surface of the electrical interconnection sheet 74 (with those portions of the tape that overhang the electrical interconnection sheet 74 adhering to the surface of the propeller blade).

Also shown in FIG. 4A is a weather-resistant transparent coating 92 covering the LEDs 82. In one embodiment, this coating 92 is comprised of a Lexan® polycarbonate. An approximate thickness 94 of the LED assembly 70, including the coating 92, can be between 3 and 4 mm. A thin LED assembly 70 is desirable for minimizing any impact of the LED assembly on the aerodynamics of the propeller blade 10. The thinness of the electrical interconnection sheet (e.g., 2-3 mils) and low profiles 98 of the LEDs 82 (e.g. approximately 0.70 mm in height for Luxeon Flash LXCL-PWF1 devices), contribute towards the thinness of the LED assembly 70.

Figure 4B:
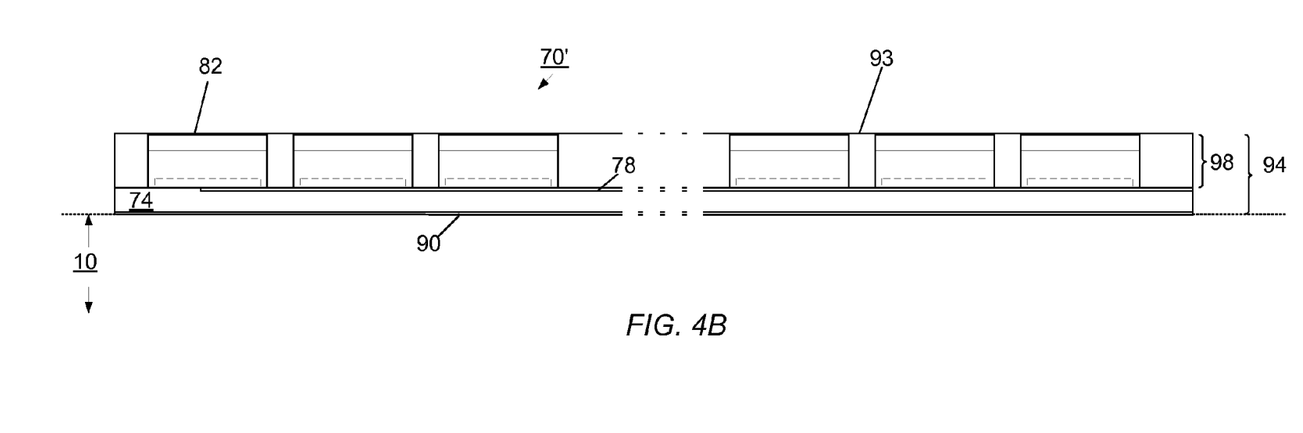
FIG. 4B is a side view of another embodiment of a light-emitting diode assembly.

In another embodiment, shown in FIG. 4B, the LED assembly 70 includes a cover 93 (e.g., made of hard or soft transparent plastic) instead of the coating 92, for housing and protecting the LEDs 82 on the electrical connection sheet 74. In this embodiment, the cover 93 can urge the LEDs 82 against the electrical connection sheet 74. Although shown being used in lieu of the coating 92, other embodiments can have the cover 93 and the coating 92. In general, "soft" clear materials have superior impact and abrasion resistance.

Figure 5:
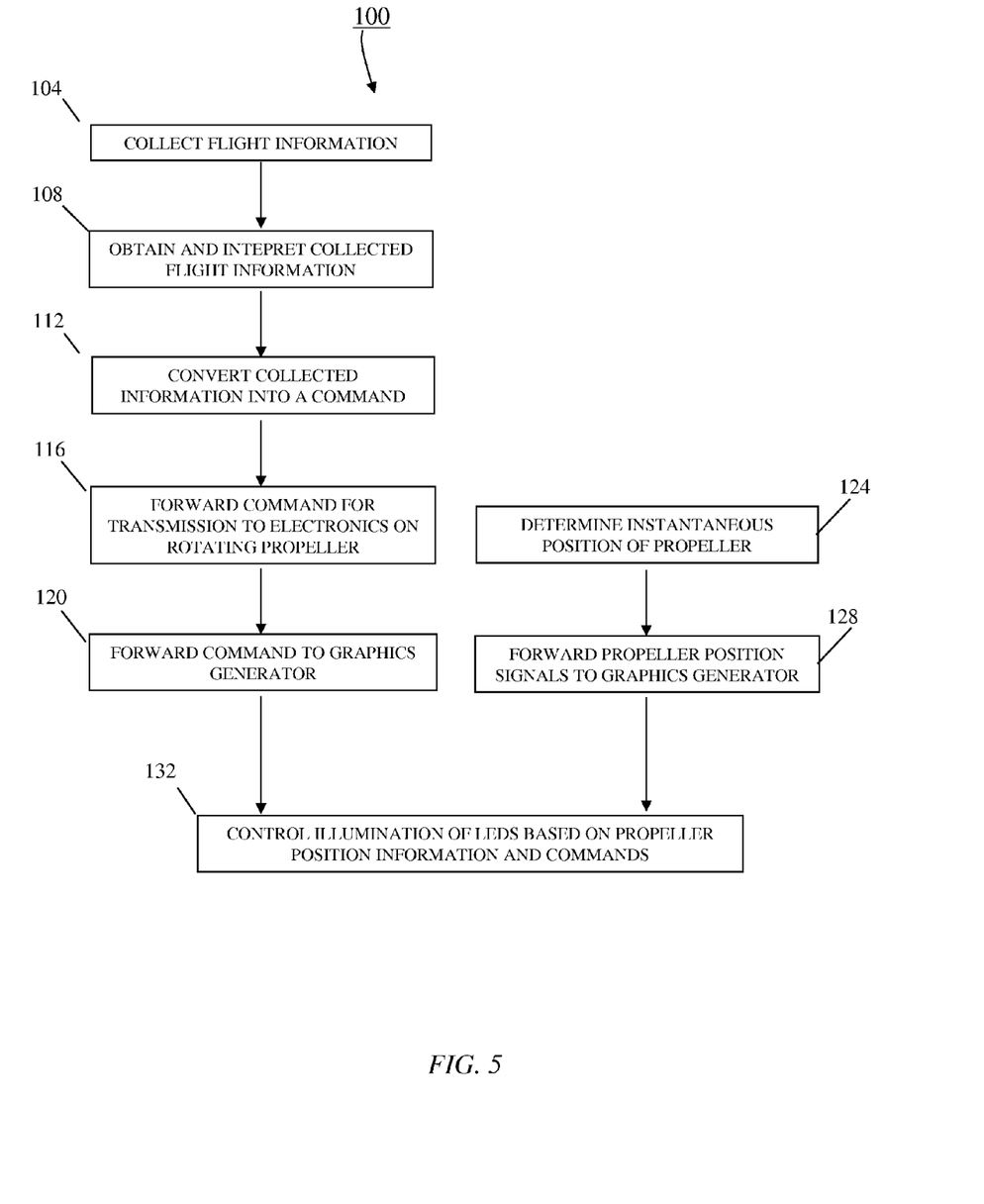
FIG. 5 is a flow diagram of an embodiment of a process for generating a graphical image in accordance with the invention.

FIG. 5 shows an embodiment of a general process 100 performed by the HUD system 20 for displaying a graphical image in accordance with the invention. In the description of the process 100, reference is made also to FIG. 2. The particular order in which the steps of the process 100 are numbered and described is exemplary. The operation of the HUD system of the invention is not limited to this particular order.

At step 104, the various sensors in the aircraft continuously collect information for distribution to the appropriate cockpit instrumentation. Examples of such information include, but are not limited to, heading, attitude, angle of attack, slip, barometric pressure, altitude, air temperature, air speed, geographic location, and the three-dimensional locations of nearby aircraft. The HUD data processor 24 receives and interprets (step 108) the collected information, converts (step 112) the information into one or more commands understood by the graphics generator 44, and forwards (step 116) each command to the first transceiver 28 for transmission to the second transceiver 32. The transmission of each command between the first and second transceivers 28, 32 can involve a handshaking protocol (i.e., transmissions with acknowledgement). The second transceiver 32 forwards (step 120) each command received from the first transceiver 28 to the graphics generator 44. In addition, the time of data transmission can provide significant information, indicating the passage of a propeller blade by a reference position (i.e., the transmission of the data is triggered by the propeller passing a predetermined orientation).

Concurrent with and independently of the operation of the HUD data processor 24, the propeller-position sensor 40 continuously determines (step 124) the instantaneous position of the propeller 6 (or its rate of rotation and phase) and provides (step 128) signals to the graphics generator 44 indicative of the currently determined propeller position.

In response to the propeller-position signals from the sensor 40 and the command from the HUD data processor 24, the graphics generator 44 activates and deactivates (step 132) certain ones of the light-emitting elements to produce one or more graphical images. In general, the generated graphical image is associated with the type of information represented by the command. This graphical image can be alphanumeric information or diagrammatic information, such as boxes, lines, circles, stars, and other types of symbology. In one embodiment, the displayed graphical images comply with MIL-STD-1787, which describes a standard for an aircraft display symbology.

In one embodiment, the displayed graphical image is conformal to the background; that is, the graphical image conforms to the shape and relative position of an object or objects in the background over which that graphical image is superimposed. For example, a displayed graphical image can outline an airport runway as the aircraft makes a final approach for landing. As another example, the displayed graphical image is a line that conforms to the horizon. As another example, the displayed graphical image can surround an aircraft that represents a potential collision threat.

Typically, narrow-beam LEDs are used to produce conformal graphical images because such LEDs emit light that can be seen only by the occupant of the aircraft for which the displayed graphical image is properly positioned. Generally, for conformal graphical images to be located properly against the background, the approximate position of the viewer needs to be known. The more precisely known is this position, the more precisely the graphical images can overlay the real-world features to which they conform. For conformal symbology (i.e., graphical image) to be used by multiple occupants simultaneously, narrow-beam LEDs are used to render the same symbology in multiple different locations, each location being suitable for a particular occupant and visible only to that occupant.

As an example, a flight path vector symbol (a small circle shown in FIG. 7 and in FIG. 8), which represents the direction of aircraft motion, would be drawn in two locations, one in front of the pilot and another in front of the copilot. Neither sees the symbol presented to the other, because each symbol is created using narrow-beam LEDs and is visible only from the viewpoint of the intended viewer.

Figure 6:
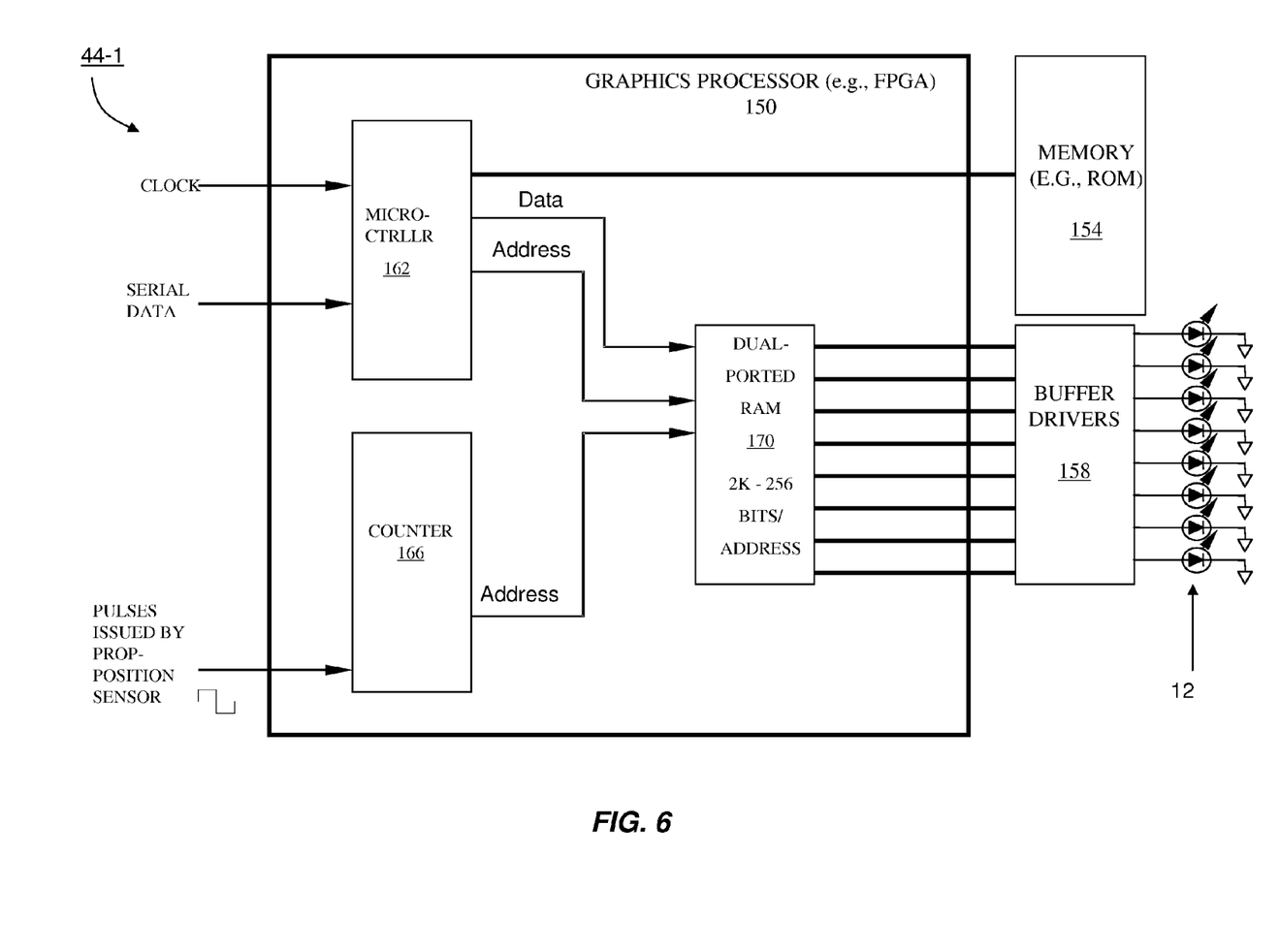
FIG. 6 is a functional diagram of an embodiment of a graphics generator for producing heads-up display graphical images in accordance with the principles of the invention.

FIG. 6 shows an embodiment of the graphics generator sub-unit 44-1 of FIG. 2, as a representative example of each graphics generator sub-unit. The circuitry described herein is exemplary; other circuits can be used to practice the principles of the invention. The graphics generator sub-unit 44-1 includes a graphics processor 150 (embodied in, for example, a field programmable gate array or FPGA), persistent memory 154 (e.g., ROM) for storing data and program code, and buffer drivers 158. In this embodiment, the graphics processor 150 includes a microcontroller 162 (e.g., Motorola 68HC12BE32), a counter 166, and random-access memory or RAM 170 (e.g., a dual-port RAM such as Cypress CY7C133, manufactured by Cypress Semiconductor). The FPGA can have other components than those described herein and perform other functions for the aircraft that are related or unrelated to the generation of graphical images.

The microcontroller 162 includes a data input terminal for receiving commands issued from the HUD data processor 24 and a clock input terminal for receiving clock pulses that control the rate of the microcontroller's operation. The microcontroller 162 is also in communication with the persistent memory 154 from which to obtain program code stored therein. By execution of the program code, the microcontroller 162 interprets the commands received on the data input terminal and, based on these commands, generates address and data signals for one port of the RAM 170, into which is stored the appropriate LED-illumination patterns.

The counter 166 includes an input terminal for receiving signals representing the instantaneous position of the propeller 6 as determined by the propeller-position sensor 40. Based on these signals, the counter 166 generates address signals for a second port of the RAM 170. For embodiments in which the propeller-position sensor 40 is an absolute encoder, that is, the sensor 40 produces an encoded binary value representing the propeller's position rather than electrical pulses, the counter 166 is unnecessary. In such embodiments, the encoded binary value passes to the RAM 170.

The RAM 170 includes two sets of input terminals. A first set of input terminals is in electrical communication with the microcontroller 162 to receive address and data signals therefrom, and a second set of input terminals is in electrical communication with the counter 166 to receive address signals therefrom. A set of output terminals of the RAM 170 is in electrical communication with buffer drivers 158 for activating and deactivating the LEDs 12 on a propeller blade 10.

The address locations of the RAM 170 have a one-to-one correspondence with the various positions of the propeller blade 10 at which one or more LEDs can be activated. The RAM 170 stores a bitmap of the graphical image or images to be displayed. Unlike X-Y bitmaps commonly associated with computer display screens, the bitmap provided by the RAM has radius (R) and theta ($\theta$) coordinates. The data values stored at each of the address locations determines which LEDs 12 are illuminated, and which LEDs 12 are not, at each identified propeller blade position during a revolution of the propeller. More specifically, each address location has a certain number of bits, and each bit corresponds to one of the LEDs 12 on the propeller blade 10. For example, if a propeller blade 10 has 256 LEDs and each address location has 256 bits, then the data value stored at a particular address location determines the illumination status of each LED. If all bits at a given address location are set to a bit value of 1 (and, for example, a 1 bit value signifies activation), then accessing this address location to read its data contents causes all 256 LEDs 12 on the propeller blade 10 to be illuminated.

Each address location is also associated with a rotational position of the propeller 6 (based on a predetermined reference point, e.g., the $0^{th}$ address location corresponding to the zero position on the propeller). Consider, for exemplary purposes only, that the RAM 170 has 360 address locations, and that each address location corresponds to a different angular position of the propeller 6 over the course of one full revolution. Then, each address location corresponds to 1° of rotation (provided the 360° of revolution are divided equally, for example, among the angular positions).

The operation of each graphics generator subunit 44-1 is illustrated by the following example. The microcontroller 162 receives at its data input terminal a command from the HUD data processor 24. Commands arrive asynchronously and independently of the rotation of the propeller 6. The microcontroller 162 executes program code to interpret the command and produce the appropriate action in response. Based on the particular command, the microcontroller 162 determines which bits of each address location are set to a 1 bit value and which bits are set to a 0 bit value. For example, consider that the command is for displaying a line when the propeller blade 10 has rotated 90° from the zero position. As used in this example, the zero position of the propeller blade 10 is along a horizontal axis of the aircraft defined from one wingtip to the other wingtip. A 90° rotation from the zero position, as used in this example, places the propeller blade 10 in a vertical position in front of the pilot with respect to the horizontal axis. In response to the command, the microcontroller 162 causes all one bit values to be written at the $90^{th}$ address location and zero bit values to be stored at all other address locations (referring again to the above example in which the 360 address locations represents a 1° increment of revolution).

Independently of the operations being performed by the microcontroller 162, the counter 166 maintains a count that increments by one for each electrical signal or pulse received from the propeller-position sensor 40. The count wraps around to zero after the maximum count is reached, i.e., after the last address location in the RAM 170 is accessed. Each different count represents a different angular position of the propeller 6 and determines which physical address location of the RAM 170 is accessed. Accordingly, while the propeller 6 rotates, the RAM 170 is continuously scanned in succession from the first address location to the last. The scan causes the data contents stored at each address location to appear at the output terminals of the RAM 170 to determine which LEDs are turned on and which LEDs are turned off.

Returning to the example of displaying a vertical line, while the count in the counter 166 is between 0 and 89, inclusive, the RAM 170 is outputting all zero values because all bits of the address locations 0 through 89 are set to zero. As a result, the LEDs 12 are off. When the count reaches 90, the data contents of the $90^{th}$ address location are output. At the $90^{th}$ address location all bits are set to one, and as a result all corresponding LEDs 12 become activated. Activation of all LEDs 12 at the 90° propeller position causes a graphical image of a vertical line to appear.

This illumination is momentary, for upon the next incrementing of the counter 166, the $91^{st}$ address location is accessed. At this address location all bits are set to zero, and, as a result, all LEDs 12 become deactivated again. Accordingly, the duration for which the LEDs are illuminated corresponds to the time taken to transition from the $90^{th}$ address location to the $91^{st}$ address location. In general, this period of time is sufficiently long for an occupant to perceive the graphical image. To improve perception of the graphical image, the LEDs 12 on the other propeller blades 10 can be similarly illuminated to refresh the vertical line when each blade 10 reaches its 90° position.

The LEDs 12 remain deactivated until the propeller 6 returns again to the 90° position. One or more LEDs may become activated sooner if the microcontroller 162 writes bit values of 1 to other address locations before the propeller returns to the 90° position.

Figure 7:
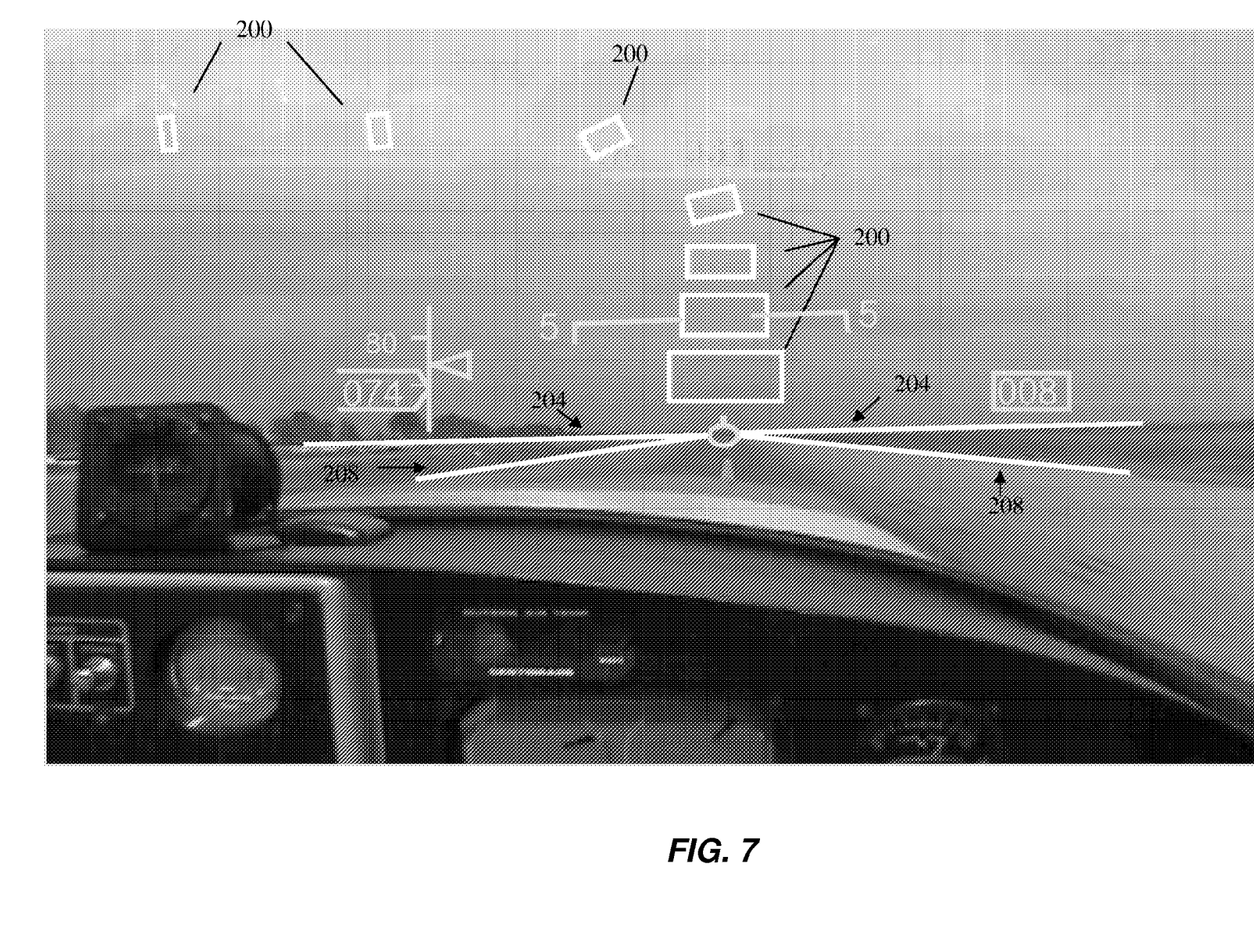
FIG. 7 is a view from the cockpit of an aircraft at an exemplary heads-up display that could operate to portray a "highway-in-the-sky."

FIG. 7 shows an exemplary heads-up display that may be produced by the HUD system 20 of the invention. This display is from the viewpoint of an occupant of the aircraft cockpit. In this example, the displayed graphical images are a series of transparent rectangles 200 banking upwards toward the left. The arrangement of the rectangles causes the larger rectangles to appear closer to the aircraft than the smaller rectangles, although the rectangles are equidistant from the cockpit. The series of rectangles form a "highway in the sky" or HITS. While the pilot guides the aircraft "through" the rectangles, the HUD system 20 continuously updates the series of rectangles being displayed. Also seen in FIG. 7 are examples of conformal graphical images. Graphical images 204 conform to the horizon, and graphical images 208 conform to the runway edges.

Figure 8:
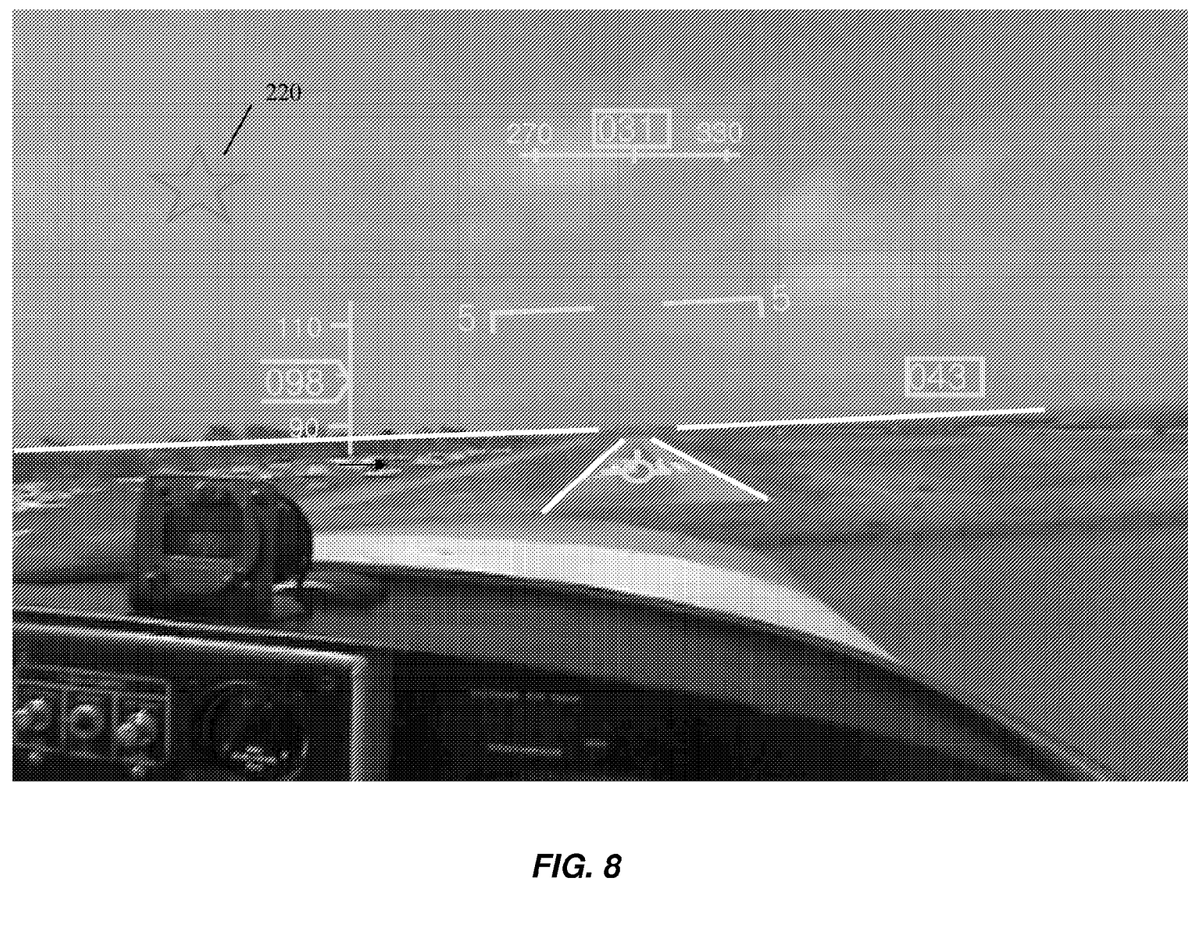
FIG. 8 is a view from the cockpit of an aircraft at an exemplary heads-up display that could operate to provide an advanced warning of other aircraft in the forward vicinity.

FIG. 8 shows another example of a heads-up display from the viewpoint of an occupant in the aircraft cockpit that may be produced by the HUD system 20 of the invention. Here, the heads-up display could operate as a collision-avoidance system. When the aircraft sensors detect another aircraft in the forward vicinity, the HUD system 20 displays a graphical image surrounding the apparent position of the other aircraft. The particular graphical image, such as a red star 220, is designed to alert an occupant of the aircraft. As a result, the pilot, passenger, or both are notified of the aircraft's presence in advance of actually seeing it.

Although the invention has been shown and described with reference to specific preferred embodiments, it should be understood by those skilled in the art that various changes in form and detail may be made therein without departing from the spirit and scope of the invention as defined by the following claims. For example, in an alternate embodiment, a two-dimensional graphical image is generated on a small stationary display, and a linear array of photosensitive elements rotating with the propeller scans the stationary device. There is a correspondence between elements in the photosensitive array and the light-emitting elements array such that the presence of a light signal on the photosensitive element causes the corresponding light-emitting element to turn on.

As another example, light-emitting elements can be disposed on a side of the propeller blade facing away from the cockpit. In this example, the graphical image being generated is visible, not to the occupants of the cockpit, but rather to those observing the aircraft, such as oncoming air traffic. In this instance, the generation of the graphical image can serve as a warning indicator or as an identifier of the aircraft. The use of forward-facing light-emitting elements can also supplement the HUD system described above. Moreover, for embodiments in which the graphical image is intended for outside observers, the propeller does not need to be in front of the cockpit (e.g., propellers mounted to the wings).

What is claimed is:

1. A heads-up display system for an aircraft having a rotating propeller assembly, the heads-up display system comprising:
    an electrical interconnection sheet;
    a plurality of light-emitting diodes (LEDs) electrically connected to the electrical interconnection sheet;
    means for securing the electrical interconnection sheet onto an outer surface of a propeller blade; and
    a graphics generator disposed in the rotating propeller assembly and in electrical communication with the electrical interconnection sheet to control illumination of the LEDs while the propeller assembly rotates.

2. The heads-up display system of claim 1, wherein the electrical interconnection sheet includes a flexible circuit.

3. The heads-up display system of claim 1, wherein the LEDs are surface mounted to a surface of the electrical interconnection sheet.

4. The heads-up display system of claim 1, wherein each LED has an approximate height of less than or equal to 1 mm.

5. The heads-up display system of claim 1, further comprising a protective coating over the electrical interconnection sheet.

6. The heads-up display system of claim 1, wherein the means for securing includes an adhesive layer on a bottom surface of the electrical interconnection sheet.

7. An aircraft, comprising:
    a propeller assembly having a plurality of propeller blades; and
    a heads-up display system including:
        an electrical interconnection sheet;
        a plurality of light-emitting diodes (LEDs) electrically connected to the electrical interconnection sheet;
        means for securing the electrical interconnection sheet onto an outer surface of one of the propeller blades; and
        a graphics generator disposed in the propeller assembly and in electrical communication with the electrical interconnection sheet to control illumination of the LEDs while the propeller assembly rotates.

8. The aircraft of claim 7, wherein the electrical interconnection sheet includes a flexible circuit.

9. The aircraft of claim 7, wherein the LEDs are surface mounted to a surface of the electrical interconnection sheet.

10. The aircraft of claim 7, wherein each LED has an approximate height of less than or equal to 1 mm.

11. The aircraft of claim 7, further comprising a protective coating over the electrical interconnection sheet.

12. The aircraft of claim 7, wherein the means for securing includes an adhesive layer on a bottom surface of the electrical interconnection sheet.

13. A propeller assembly, comprising:
    a propeller blade;
    an electrical interconnection sheet;
    a plurality of light-emitting diodes (LEDs) electrically connected to the electrical interconnection sheet;
    means for securing the electrical interconnection sheet onto an outer surface of the propeller blade; and
    a hub having a graphics generator that is in electrical communication with the electrical interconnection sheet to control illumination of the LEDs while the propeller assembly rotates.

14. The propeller assembly of claim 13, wherein the electrical interconnection sheet includes a flexible circuit.

15. The propeller assembly of claim 13, wherein the LEDs are surface mounted to a surface of the electrical interconnection sheet.

16. The propeller assembly of claim 13, wherein each LED has an approximate height of less than or equal to 1 mm.

17. The propeller assembly of claim 13, further comprising a protective coating over the electrical interconnection sheet.

18. The propeller assembly of claim 13, wherein the means for securing include an adhesive layer on a bottom surface of the electrical interconnection sheet.

19. A method of preparing an aircraft propeller for use with a heads-up display system, the method comprising:
  providing an electrical interconnection sheet;
  electrically connecting a plurality of light-emitting diodes (LEDs) to the electrical interconnection sheet to produce an LED assembly;
  adhering the electrical interconnection sheet to an outer surface of a propeller blade; and
  balancing the propeller with the propeller blade having the LED assembly adhered thereto.

20. The method of claim 19, wherein the step of electrically connecting includes the step of surface mounting the plurality of LEDs to a flex circuit.

* * * * *